Sept. 11, 1928.
J. C. NORWOOD
MOLD
Filed July 16, 1927
1,684,360
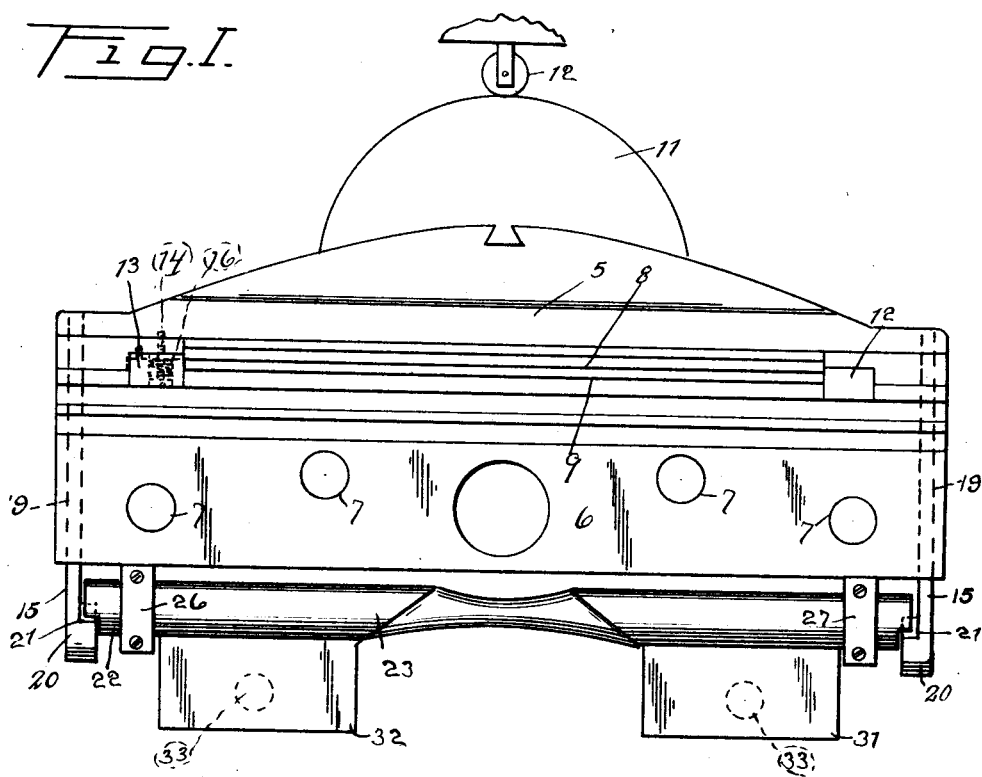
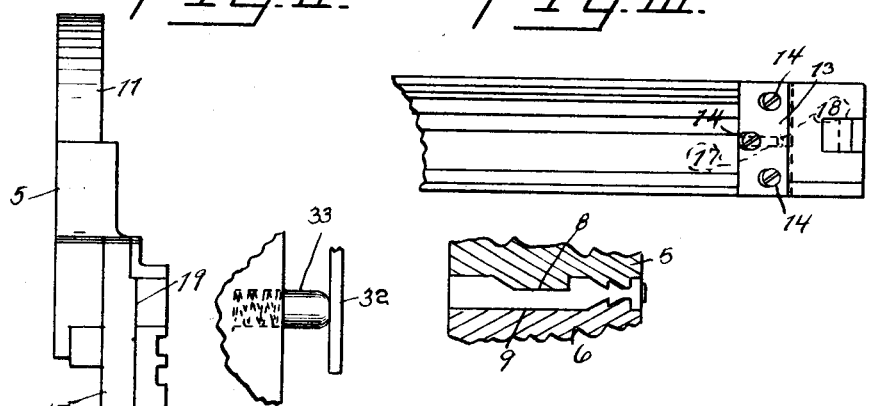
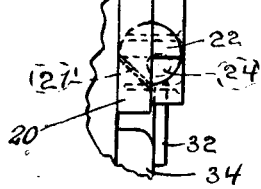
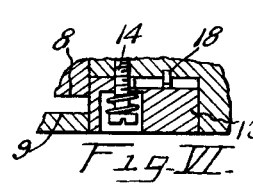
INVENTOR.
J. C. NORWOOD
BY
ATTORNEY Patented Sept. 11, 1928.

1,684,360

UNITED STATES PATENT OFFICE.

JOSEPH C. NORWOOD, OF SAN FRANCISCO, CALIFORNIA, ASSIGNOR TO INTERTYPE CORPORATION, A CORPORATION OF NEW YORK.

MOLD.

Application filed July 16, 1927. Serial No. 206,222.

This invention relates to improvements in molds for use with machines for casting lines of type.

The principal object of this invention is to produce a mold of which the upper and lower sections are spread apart by the slug or line of type when such slug or line of type is ejected from the mold and to further provide means for bringing the upper and lower sections of the mold together after the type slug has been ejected.

A still further object is to produce a mold which is simple in construction and one which will not bind through the action of the heat from the hot metal cast therein.

A still further object is to produce a mold which may be attached to the mold wheel of any of the known forms of machines for casting integral lines of type.

Other objects and advantages will be apparent during the course of the following description.

In the accompanying drawings forming a part of this specification and in which like numerals are employed to designate like parts throughout the same, Figure I is a front elevation of my improved mold, Figure II is a side elevation of Figure I and showing a fragment of a mold wheel, Figure III is a fragmentary detail view showing the upper mold face, Figure IV is a fragmentary detail view showing the spring pressed plunger for operating the closing element of my device, Figure V is a vertical cross section through the upper and lower mold faces, and Figure VI is a fragmentary detail view through one of the liners showing the manner in which the liner is movably held.

Type casting machines have been employed for many years for the purpose of casting lines of type from which printing was done.

It is my object to produce a mold for casting lines of type suitable for use in a well known form of printing machine wherein separate type having grooves or shoulders on their opposite sides are inserted in slots extending transversely of the bed plate, thus eliminating the necessity of setting up separate type for use in such a machine, and in order to produce a mold which is equally applicable to various types of type casting machines, I have devised a mold which is illustrated in the drawings, wherein the numeral 5 designates the upper mold section and the numeral 6 the lower mold section.

The lower mold section 6 is secured to the casting wheel of the type casting machine by means of screws which pass through the openings 7 and into the mold wheel. The upper mold section 5 is movable toward and away from the lower mold section and has a casting face 8, while the lower mold section has a casting face 9. Secured to the upper mold section is a cam plate 11, the purpose of which will be later seen.

In order to obtain definite spaced relation between the mold sections, I provide liners 12 and 13 on one of the mold sections one of which liners is movable longitudinally of the mold section by which it is carried so as to permit lineal expansion of such mold section without affecting the operation of the device.

In the present instance I have shown the liner 13 as being the movable liner and as being held to the upper mold section as by screws 14, each of which screws has a spring 16 carried thereon, the purpose of which spring is to maintain the liner in intimate contact with the upper mold section.

This liner 13 is movable longitudinally of the upper mold section and by viewing Figs. III and IV it will be noted that a groove 17 is provided in its upper surface, into which a pin 18 carried in the upper mold section sets. This groove and pin serve to maintain the front and back faces of the liner from moving out of alignment with the front and back faces of the upper mold section.

It will also be noted by viewing these figures that the slots through which the screws 14 pass are slightly elongated so as to permit the liner 13 to move longitudinally of the upper mold section. The upper mold section has secured thereto downwardly projecting pull rods 15, one being at each end of the mold section. These pull rods pass downwardly through slots 19 formed in the lower mold section and each pull rod terminates in a head 20 which head has a cam surface 21 adapted to be engaged by a cam 22 formed on one end of a rod 23 eccentrically journaled, as shown at 24, in bearings 26 and 27 carried by the lower mold section.

Wings 31 and 32 are secured to the rod 23 in such a manner that, when the mold sections are in casting relation, these wings will be substantially parallel with the surface of the mold wheel. The result of this construction is that, when my mold is secured to a mold wheel of one form of type casting machine wherein the mold wheel carries the mold upon its outer face, the operation is as follows:—

When the mold wheel is turned to casting position, the cam plate 11 carried by the upper mold section will pass beneath a roller 12 mounted upon the machine in a suitable manner. This will result in holding the two mold sections together with sufficient pressure so that the casting of the metal under force will not spread the upper section and the lower section of the mold. At the same time the spring plungers 33 carried on the mold apart wheel (see Figures I and IV) will push upon the wings 31 and 32 so as to rock the rod 23, thus causing the cams 22 to bear upon the cam surfaces 21, and to pull down upon the rods 15 which will lock the mold sections together while the casting takes place.

The operation is identical on both of the well known forms of casting machines now in commercial use the only difference being that in one form of such machine a cam 34 (Fig. 11) moves between the wings 31 and 32 and the mold wheel thus locking said wings against movement. During the casting operation this cam 34 takes the place of the cam plate 11 and the roller 12 employed in another form of such machine.

It will thus be seen that I have produced a very simple mold which will open and close and one which will be held tightly closed during the casting operation, and further that I have provided a movable liner which will permit lineal expansion of the mold sections by which it is carried while the liner remains in register with the other mold section, thus preventing the formation of fins on the ends of the cast slugs.

It is to be understood that the form of my invention herein shown and described is to be taken as a preferred example of the same and that various changes relative to the material, size, shape and arrangement of parts may be resorted to without departing from the spirit of the invention or the scope of the subjoined claims.

Having thus described my invention, I claim—

1. In a mold for a type casting machine, a lower mold section, an upper mold section, liners interposed between said mold sections, one of said liners being movable longitudinally with respect to the upper mold section and immovable with respect to said lower mold section, and means for maintaining said liner in intimate contact with said upper mold section.

2. In a mold for a type casting machine, a lower mold section, an upper mold section, liners interposed between said mold sections, one of said liners being movable longitudinally with respect to the upper mold section and held against lateral movement with respect to said lower mold section, means for maintaining said liner in intimate contact with said upper mold section, draw bars secured to the opposite ends of the upper mold section, said draw bars extending to a point below said lower mold section, and means for exerting downward pull on said draw bars for the purpose specified.

3. In a mold for a type casting machine, a lower mold section, an upper mold section, liners interposed between said mold sections, one of said liners being movable longitudinally with respect to the upper mold section and held against longitudinal movement with respect to said lower mold section, means for maintaining said liner in intimate contact with said upper mold section, draw bars secured to the opposite ends of the upper mold section, said draw bars extending to a point below said lower mold section, means for exerting downward pull on said draw bars, said means comprising a rod eccentrically journaled beneath said lower mold section, cam surfaces formed on said draw bars, cam surfaces formed on said rod and means for rotating said rod for the purpose specified.

In testimony whereof I affix my signature.

JOSEPH C. NORWOOD.